C. L. CORCUERA.
PROCESS FOR THE EXTRACTION OF SACCHARINE SUBSTANCES.
APPLICATION FILED DEC. 4, 1907.
1,015,941.
Patented Jan. 30, 1912.
2 SHEETS—SHEET 1.
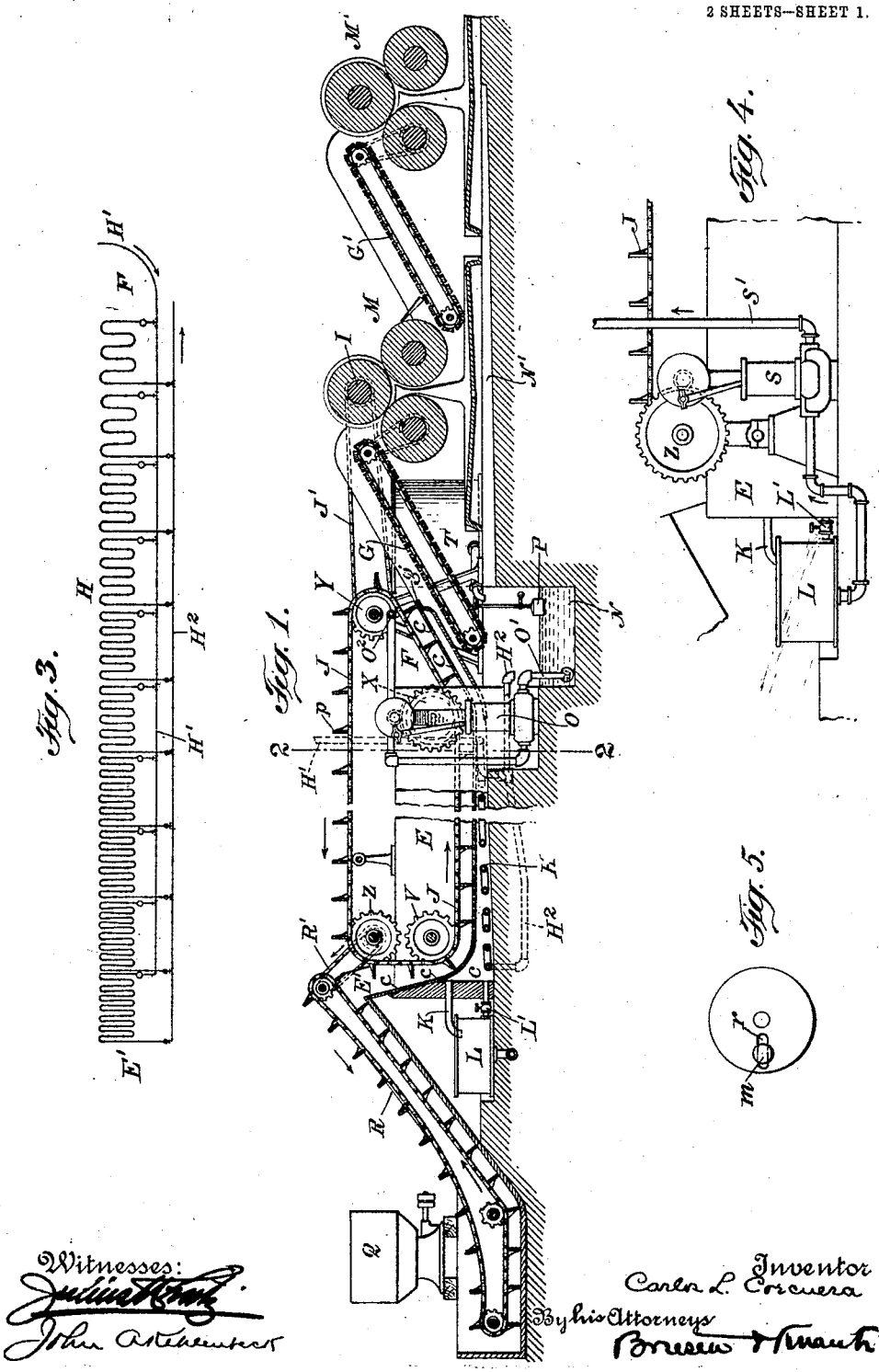

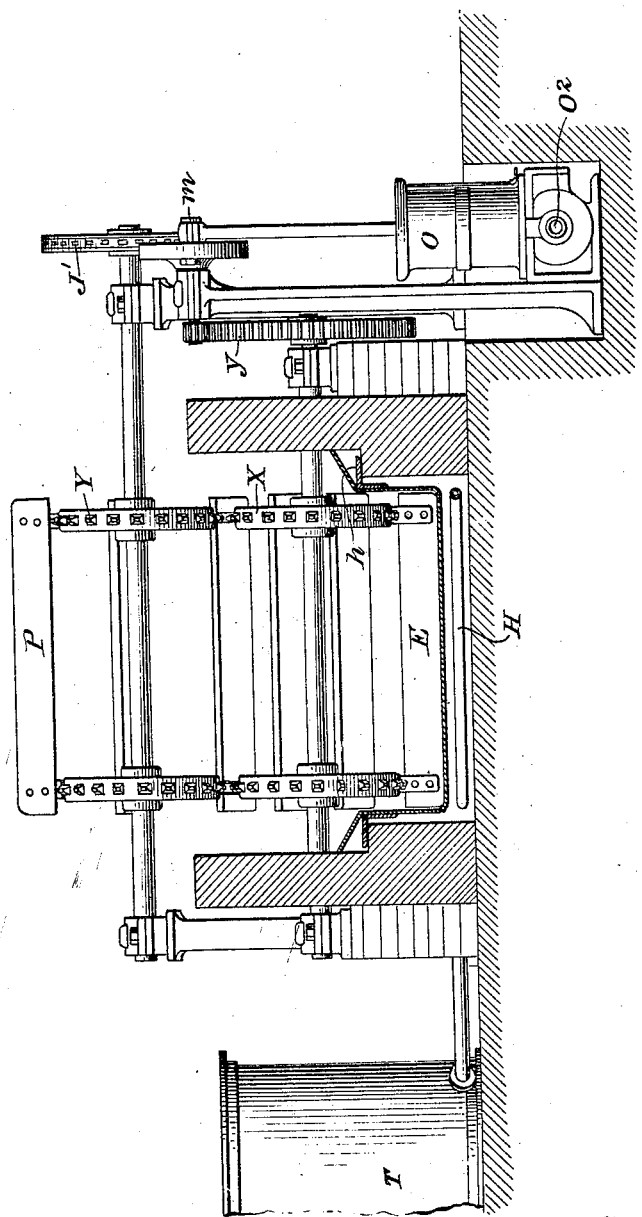

UNITED STATES PATENT OFFICE.

CARLOS L. CORCUERA, OF GUADALAJARA, MEXICO.

PROCESS FOR THE EXTRACTION OF SACCHARINE SUBSTANCES.

1,015,941.      Specification of Letters Patent.      Patented Jan. 30, 1912.

Application filed December 4, 1907. Serial No. 405,017.

*To all whom it may concern:*

Be it known that I, CARLOS L. CORCUERA, a citizen of the Republic of Mexico, and resident of the city of Guadalajara, State of Jalisco, Mexico, have invented certain new and useful Improvements in Processes for the Extraction of Saccharine Substances, of which the following is a specification.

My invention relates to the extraction of saccharine substances from vegetable matter containing them, as from sugar cane, bagasse, mescal, beet root, etc.

The object of my invention is to provide a very efficient process for extracting the said saccharine substances with a minimum supply of liquid.

For this purpose my invention consists in a treatment involving a particular novel adjustment of temperatures and relative movement of the vegetable matter and liquid, as will be fully set forth hereinafter and particularly pointed out in the appended claims.

Reference is to be had to the accompanying drawings which represent an apparatus suitable for carrying out my invention and in which—

Figure 1 is a longitudinal section of the apparatus, with parts broken away; Fig. 2 is a cross section taken on line 2—2 of Fig. 1; Fig. 3 is a diagram of the heating coils; Fig. 4 is a side elevation of a portion of the apparatus; and Fig. 5 is a detail showing an adjustable crank pin connection for varying the stroke of a circulating pump.

The plant from which the sugar is to be extracted, for instance sugar cane or sugar beet, is first disintegrated in any suitable manner, as by means of a shredding or rasping machine Q. The slices or pieces drop on the upper run of a suitable conveyer R, preferably inclined upward as shown, the said conveyer being driven from a sprocket Z by means of a chain R' indicated in Fig. 1. The chopped cane or other plant thus reaches the receiving end E' of a trough E, which I term the diffusing trough. This trough is raised sharply at the inlet end E' as shown and also, but preferably at an incline of say about 30 degrees, at the outlet F. As shown in Fig. 2 this trough is supported by means of brackets $h$ on suitable shoulders formed on walls which form an exterior trough or tank in which the above mentioned copper trough is partly immersed, the interior or upper trough being perforated all over, except at the portions indicated by the letters $c$—$c$. Through these perforations the two troughs communicate with each other, thus affording a free circulation for the juice, which in the upper trough is in contact with the plant and in the lower trough with the steam coils H. Strengthening ribs may be riveted to the sides and bottom of the upper trough to keep it stationary and horizontal. As may be seen by reference to Figs. 1, 2 and 3, I have provided a peculiar arrangement of heating coils for producing a temperature varying from one end of the diffusing trough to the other. For this purpose the heating coils are arranged in groups and those nearer the inlet E' of the diffusing trough have a larger heating surface than those nearer the outlet F. Fig. 3 shows that the two coil sections adjacent to the outlet have the same heating surface, the next two coil sections have a somewhat larger heating surface, then again, the next two have a still larger heating surface and so on, the two coil sections at the extreme left having the largest heating surface. Each section has a separate inlet and outlet for steam supply and return pipes $H'$ and $H^2$ respectively. With this arrangement it will be obvious that the highest temperature will be obtained near the inlet E' and the temperature will decrease gradually toward the outlet F. For instance I may obtain a temperature of about 95 degrees centigrade at the inlet and cause the temperature to fall progressively to 70, 65, 60, 55 and 50 degrees toward the outlet F.

The cut material which the conveyer R drops into the receiving end E' of the diffusing trough is fed lengthwise of said trough by means of a conveyer J running over sprocket wheels V, X, Y, Z. This conveyer is driven by means of a chain J' from a sprocket wheel I. By substituting change sprockets at I the rate of travel of the conveyers J and R may be varied at will. The blades $p$ of the conveyer J should leave a small clearance at the sides as indicated in Fig. 2. In some cases when the conveyer travels at a very low speed, it may be advisable to increase the width of the blades $p$ by screwing on their upper parts strips of sheet copper, which should be perforated so as not to interfere with the motion of the liquid which travels in a direction opposite to that of the conveyer. The blades shown in the drawing may be made of wood and it is desirable, though not essential, that they should be perforated for the better circulation of the liquid. The level of the liquid in the diffusing trough is governed by the overflow or outlet pipe K leading to a tank L from which the diffusion juice is conveyed by the action of the pump S and through a pipe S' to suitable apparatus for defecating the juice.

The cane or other substance which has been submitted to diffusion or extraction of saccharine matter in the trough drops from the raised outlet edge $g$ of the upper trough onto a suitable conveyer G which feeds such material to the first mill M. The linear speed of the conveyer G should be equal to that of the crushing mill. From the first crushing mill the material passes to another conveyer G' and to a second crushing mill M'. Any juice which drains from the elevators or conveyers G—G' as well as the poor juice which comes from the first and second mills M—M' is received in a vat N, either directly or by means of a collecting gutter N'. The bagasse is generally used as fuel for the boilers.

The vat N, besides receiving the poor juice and the drainings from the elevators G—G' also receives the condensed steam from the return pipe H² and hot water from a tank T. The addition of hot water is not always necessary as particularly with sugar cane the plant itself may contain a sufficient amount of juice to successfully carry out my improved treatment. The supply of hot water may be regulated by a float P of any well-known or approved construction.

The liquid contained in the vat N is raised by a pump O through a pipe O' and discharged into the diffusion trough near its outlet end F through a pipe O². The amount of liquid fed by this pipe into the trough should of course vary according to the character of the plant and for this purpose the stroke of the pump is preferably made adjustable, which may be accomplished by the construction illustrated in Fig. 5 where $r$ indicates a radial groove provided in the fly wheel of the pump and $m$ an adjustable crank pin to which the connecting rod of the pump is attached. The pump is driven in any suitable manner for instance by gearing Y from the shaft of the sprocket X (Fig. 2). It will thus be seen that the juice fed by the pump O travels lengthwise in the diffusion trough from the outlet toward the inlet, and becomes heated to a progressively higher temperature as it approaches the inlet end E'. The disintegrated plant travels in the opposite direction under the influence of the conveyer J and owing to this arrangement a very efficient extraction of the saccharine matter from the plant is obtained. The bottom of the outer or lower trough may be inclined as shown in Fig. 1 to facilitate the emptying of this trough when desired by means of the normally closed valved pipe connection L' to the lower portion of the tank L (see Figs. 1 and 4.)

The apparatus is used in different ways according to the particular plant to be treated, the difference residing in the degree of temperature employed, the rate of speed of the various conveyers, the amount of liquid supplied by the pump O and the amount of water added from the tank T. As stated above, in some cases it is not necessary to supply any water from the tank T. When mescal is to be treated it is first saccharified by heating in a suitable apparatus, is then shredded and after passing through a triturating machine of any suitable construction it is brought to the conveyer R of my apparatus and treated in the manner hereinbefore described.

I claim as my invention:

1. The herein described process of extracting sacchariferous material from plants, which consists in disintegrating the plants and causing them to travel in contact with an extracting liquid while positively heating them, in stages, to a progressively decreasing temperature.

2. The herein described process of extracting sacchariferous material from plants, which consists in disintegrating the plants, and causing them to travel in one direction in contact with a liquid traveling in the opposite direction, the plants, while traveling in contact with such liquid, being heated positively to a progressively decreasing temperature.

3. The herein described process of extracting sacchariferous material from plants, which consists in disintegrating the plants and causing them to travel in contact with an extracting liquid while heating them positively to a gradually decreasing temperature.

4. The herein described process of extracting sacchariferous material from plants, which consists in disintegrating the plants, and causing them to travel in one direction in contact with a liquid traveling in the opposite direction, the plants, while traveling in contact with such liquid, being heated positively to a progressively decreasing temperature, separating such liquid from the treated material, subjecting such remaining material to pressure, and returning the juice extracted by such pressure into contact with the disintegrated plant material.

In testimony whereof, I have signed this specification in the presence of two subscribing witnesses.

CARLOS L. CORCUERA.

Witnesses:
IGNACIO FORKARY,
R. AXTLE, Jr.